(12) United States Patent
Sun

(10) Patent No.: US 9,694,492 B2
(45) Date of Patent: Jul. 4, 2017

(54) MAGNETIC PICK-UP DEVICE

(71) Applicant: Shanghai Easy-use Tools Enterprise Co., Ltd, Shanghai (CN)

(72) Inventor: Shiyu Sun, Shanghai (CN)

(73) Assignee: Shanghai Easy-use Tools Enterprise Co., Ltd. (CN)

( * ) Notice: Subject to any disclaimer, the term of this patent is extended or adjusted under 35 U.S.C. 154(b) by 60 days.

(21) Appl. No.: 14/430,544

(22) PCT Filed: May 6, 2014

(86) PCT No.: PCT/CN2014/079307
§ 371 (c)(1),
(2) Date: Mar. 23, 2015

(87) PCT Pub. No.: WO2015/103844
PCT Pub. Date: Jul. 16, 2015

(65) Prior Publication Data
US 2016/0256996 A1    Sep. 8, 2016

(30) Foreign Application Priority Data
Jan. 13, 2014  (CN) .................... 2014 2 0019228 U

(51) Int. Cl.
| B25J 1/04 | (2006.01) |
| B25J 19/00 | (2006.01) |
| B25F 1/00 | (2006.01) |
| B25G 1/04 | (2006.01) |
| B25B 9/02 | (2006.01) |
| F21V 33/00 | (2006.01) |
| F21L 4/00 | (2006.01) |
| F21V 21/22 | (2006.01) |
| F21Y 115/10 | (2016.01) |

(52) U.S. Cl.
CPC ...... *B25J 1/04* (2013.01); *B25B 9/02* (2013.01); *B25F 1/00* (2013.01); *B25G 1/04* (2013.01); *B25J 19/00* (2013.01); *F21L 4/00* (2013.01); *F21V 21/22* (2013.01); *F21V 33/0084* (2013.01); *F21Y 2115/10* (2016.08)

(58) Field of Classification Search
CPC ....................................................... B25J 1/04
USPC ..... 294/65.5, 181, 209, 210; 335/285; 81/24
See application file for complete search history.

(56) References Cited

U.S. PATENT DOCUMENTS

| 3,384,408 A | * | 5/1968 | Furzey | ...................... B25B 9/00 294/65.5 |
| D378,337 S | * | 3/1997 | Reynolds | ......................... D8/14 |
| 5,915,825 A | * | 6/1999 | Weister | ................... A61B 1/267 362/138 |
| 5,975,712 A | * | 11/1999 | Shiao | ...................... B25B 23/18 362/120 |
| 6,007,214 A | * | 12/1999 | Shiao | ...................... B25B 9/00 362/109 |
| 6,260,980 B1 | * | 7/2001 | Ping | ......................... B25B 9/00 294/65.5 |

(Continued)

*Primary Examiner* — Paul T Chin

(57) ABSTRACT

A device for picking up objects comprising a magnetic head and handle, wherein a movable component is set between the magnetic head and the handle; a lens is movably set on the magnetic head; the lens comprises a front cover and a rear cover; two lamps and a magnetic block are set on the magnetic head, one of the lamps is fixed on the front of the magnetic head by a rotating shaft.

4 Claims, 5 Drawing Sheets

(56) References Cited

U.S. PATENT DOCUMENTS

| | | | |
|---|---|---|---|
| 6,698,906 B1* | 3/2004 | Tally | B25B 9/00 359/864 |
| 7,052,155 B2* | 5/2006 | Gavin | F21V 33/0084 294/65.5 |
| 7,497,591 B1* | 3/2009 | Bix | A61N 5/0613 362/184 |
| 7,510,295 B2* | 3/2009 | Shih | F21L 4/045 362/119 |
| D625,573 S * | 10/2010 | Bonzer | D8/107 |
| 8,487,576 B2* | 7/2013 | Suzuki | H02P 7/29 318/472 |
| 8,690,376 B2* | 4/2014 | Coleman | G01N 21/8806 362/119 |
| 2005/0201085 A1* | 9/2005 | Aikawa | F21L 4/045 362/198 |
| 2008/0051628 A1* | 2/2008 | Pecherer | A61B 1/267 600/112 |
| 2013/0176715 A1* | 7/2013 | Rubino | F21L 4/04 362/188 |

* cited by examiner

MAGNETIC PICK-UP DEVICE

CROSS-REFERENCE TO RELATED APPLICATIONS

This application claims priority to Chinese Application No. 201420019228.0, filed Jan. 13, 2014, which is hereby incorporated by reference in its entirety.

TECHNICAL FIELD

The present application relates to a device for picking up objects.

BACKGROUND

There are many kinds of devices for picking up objects in the existing technology, such as magnets with lamps, mirrors with lamps, and magnets with mirrors. In a workshop or repair shop, the screws and nuts can fall into a narrow dark corner, therefore becoming difficult to see and pick them up. Devices used to pick up objects having adsorbing metal are needed and these devices should be equipped with a magnetic head. In the market, the existing devices used for picking up objects with a magnetic head, lamp, and mirror are complex. The bulk of the devices for picking up objects with mirror are large and too hard to discount the mirror and the magnetic head. When the device for picking up objects is needed in a narrow space, the mirror of the device for picking up objects cannot freely enter and therefore difficult to apply it in small corners.

SUMMARY

The present application is directed to a device for picking up objects.

An embodiment of the present application provides a device for picking up objects, which comprises a magnetic head for picking up objects and handle, wherein a movable component is set between the magnetic head and the handle; a lens is movably set on the magnetic head; the lens comprises a front cover and a rear cover; a lens is set on the front cover; two lamps and a magnetic block are set on the magnetic head, one of the lamps is fixed on the front of the magnetic head by a rotating shaft.

Preferably, another magnet block is set on bottom of the handle.

Preferably, there are batteries, switches, and wires set inside the magnetic head or the handle.

Preferably, a telescopic rod is set on the handle.

Preferably, a groove is set on the back of the rear cover, the magnetic head is set in the groove; a chute is set on the upper side of the left wall and right wall of the magnetic head; fastening strips matched with the chute are set on both sides of the groove.

Preferably, other lamps are set on the back of the rear cover.

It is to be understood that both the foregoing general description and the following detailed description are exemplary and are not meant to be restrictive. The accompanying drawings, which constitute a part of the specification, illustrate an embodiment of the disclosure and together with the general description, serve to explain the principle of the disclosure.

BRIEF DESCRIPTION OF THE DRAWINGS

The numerous advantages of the present application may be better understood by those skilled in the art by reference to the accompanying figures.

DETAILED DESCRIPTION

Figure 1:
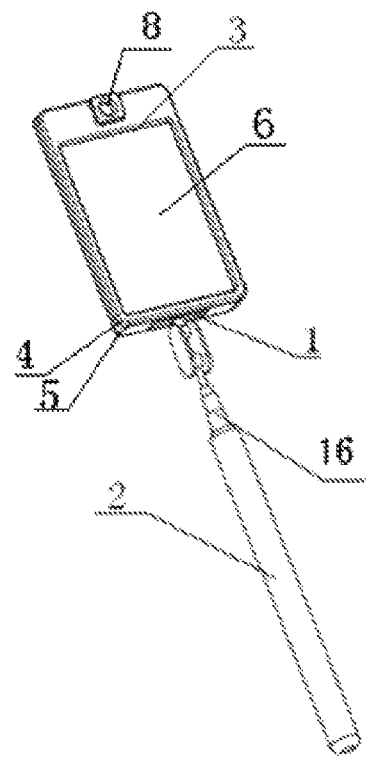
FIG. 1 is a structural schematic drawing of a device for picking up objects according to the present application.
Figure 2:
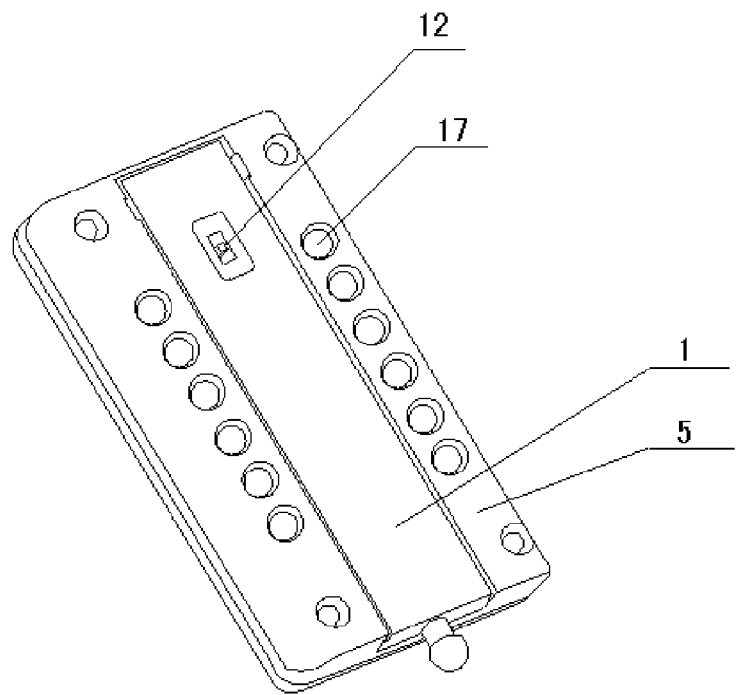
FIG. 2 is a combination structural schematic drawing of the lens and magnetic head of a device for picking up objects according to the present application.
Figure 3:
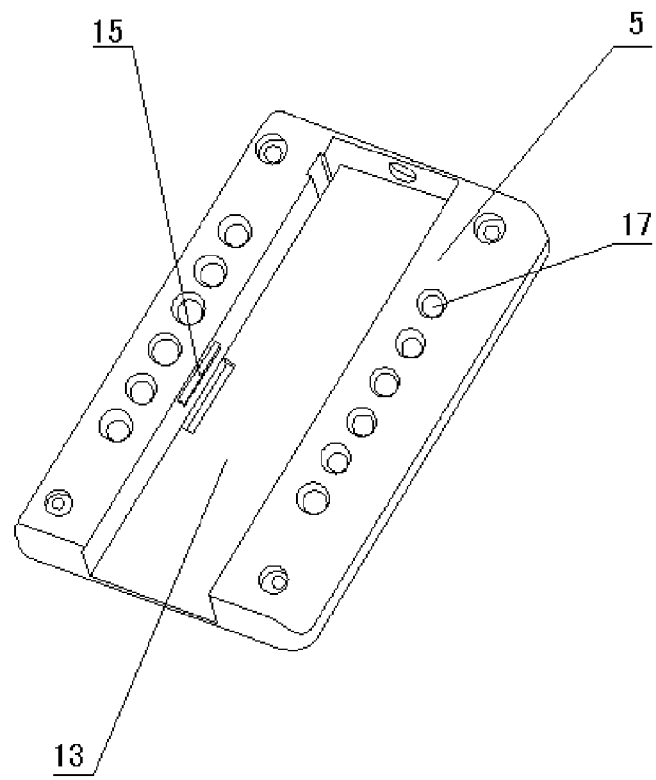
FIG. 3 is a structural schematic drawing of the rear cover of the lens of device for picking up objects according to the present application.
Figure 4:
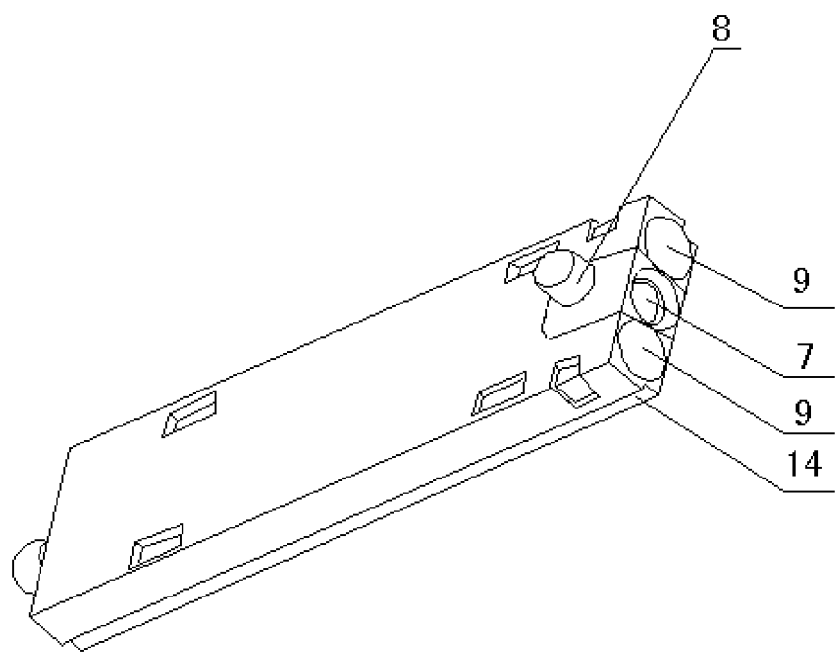
FIG. 4 is a front structural view of the magnetic head of a device for picking up objects according to the present application.
Figure 5:
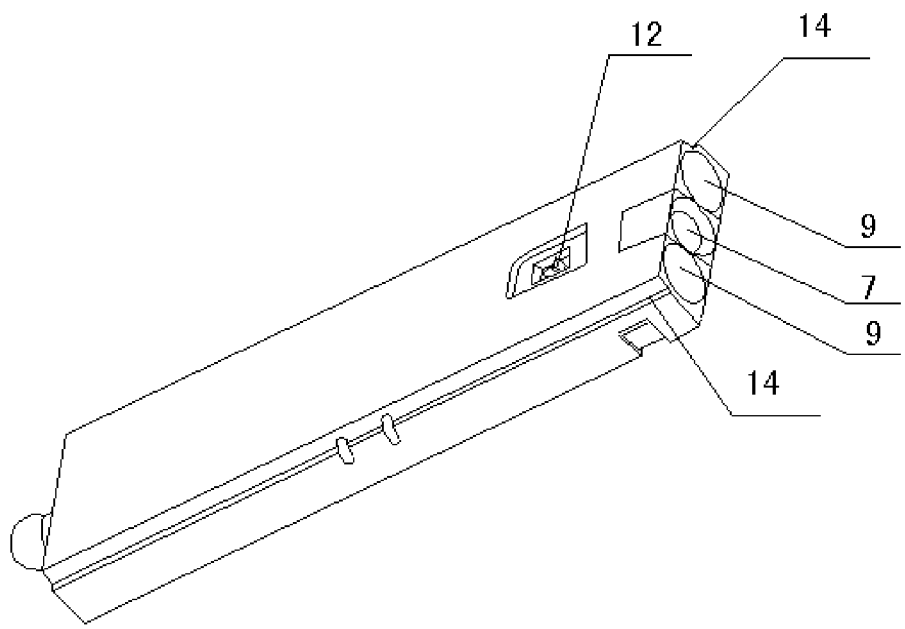
FIG. 5 is a back structural view of the magnetic head of a device for picking up objects according to the present application.

Reference will now be made in detail to the subject matter disclosed, which is illustrated in the accompanying drawings.

Referring to FIGS. 1-5, the present application provides a device for picking up objects, which includes a magnetic head 1 and a handle 2. A movable component is set between the magnetic head 1 and handle 2. A lens 3 is movably set on the magnetic head 1. The lens includes a front cover and a rear cover. The lens 6 is set on the front cover of the lens. A lamp 7, lamp 8 and a magnet block 9′ are set on the magnetic head 1.

A magnet block 10 is set on the bottom of the handle 2. It may utilize the magnetic force of the magnet block 10 to fix the device for picking up objects at a position on a metal. The device for picking up objects can also be used as a working lamp.

A groove 13 is set on the back of the rear cover 5, and the magnetic head 1 is set in the groove 13. A chute 14 is set on the head of the left and right wall of the magnetic head 1. Fastening strips 15 are matched with the chute 14 and set on both sides of the groove 13. When the magnetic head 1 is slid downward, the lens 3 can be taken off. When the magnetic head 1 is slid upward, the chute 14 is slided into the fastening strips 15. The fastening strips 15 connect the magnetic head 1 and lens 3 and they form the entirety.

A telescopic rod 16 is set on the handle 2, the design of the telescopic rod minimizes the bulk of the product, which is easy for carrying and storage. The lamp 7, lamp 8 and lamp 17 are LED lighting lamps. Multiple lighting lamps may result in the device being used in a dark place and increase the practicability of the device.

There are batteries 11, switches 12, and wires in the magnetic head 1 or in the handle 2.

Figure 6:
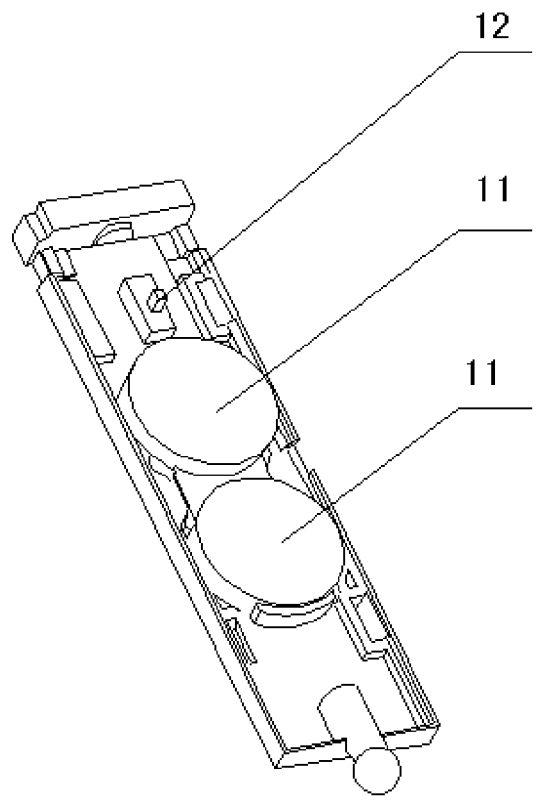
FIG. 6 is an internal view of the magnetic head with batteries of a device for picking up objects according to the present application.

As shown in FIG. 6, the batteries 11, switches 12, and wires are set in the magnetic head 1.

Figure 7:
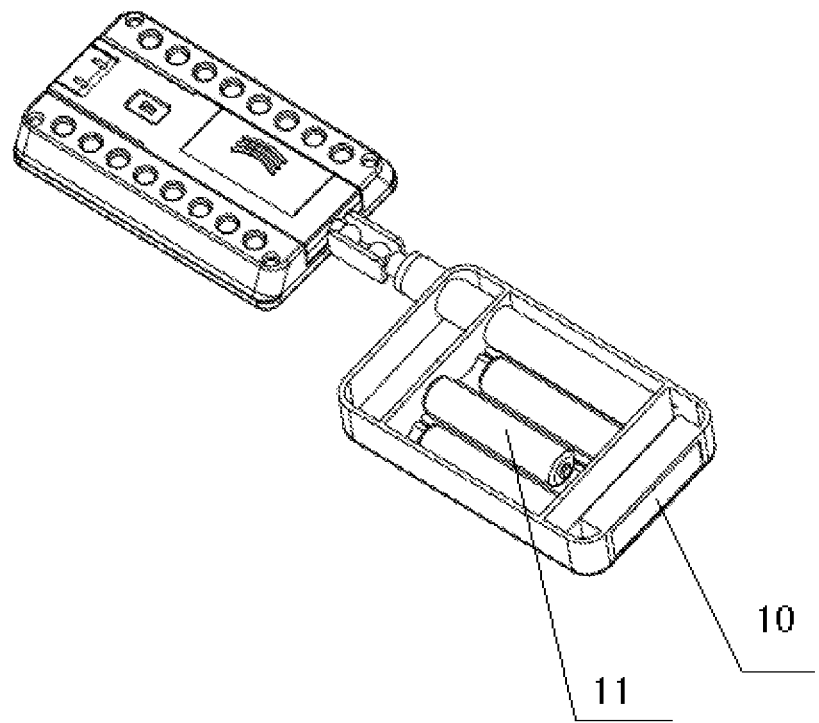
FIG. 7 is an internal view of the handle with batteries of a device for picking up objects according to the present application.

As shown in FIG. 7, the batteries 11, switches 12, and wires are set in the handle 2.

The telescopic rod 16 is set in the handle 2. There are additional lamps 17 set on the back of the rear cover 5.

The lamp 8 is fixed on the front of the magnetic head 1 by a movable component. The movable component may rotate the lamp 8 360° and be used to change the direction of the light freely.

Figure 8:
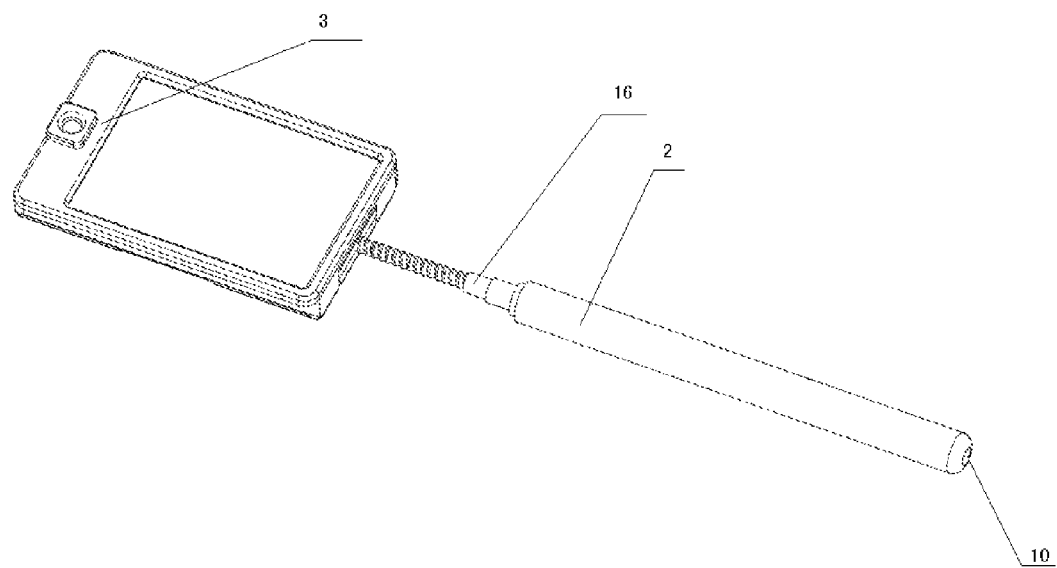
FIG. 8 is a schematic drawing of an additional connection form of the handle and the magnetic head of a device for picking up objects according to the present application.
Figure 9:
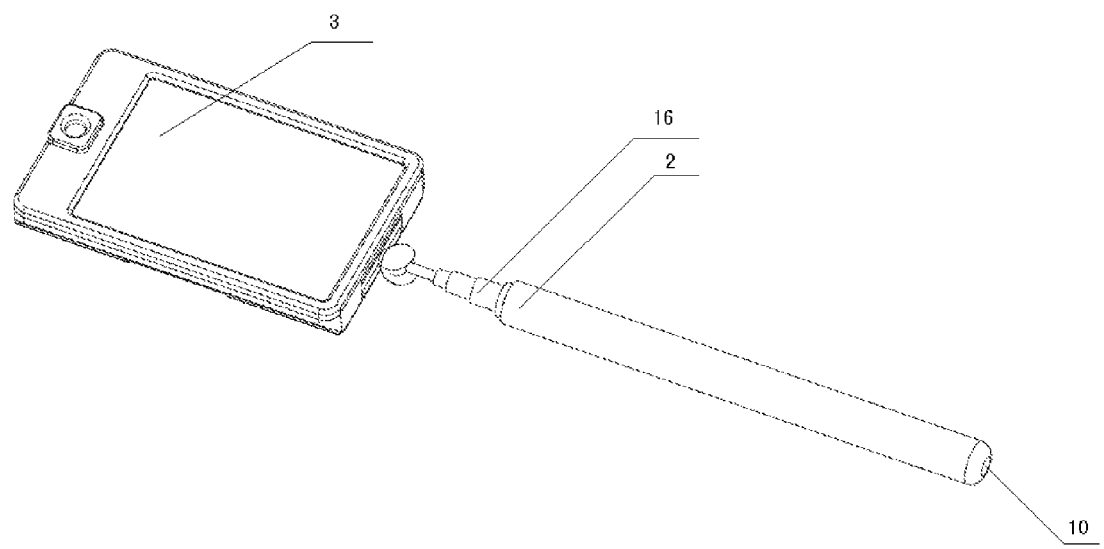
FIG. 9 is a schematic drawing of an additional connection form of the handle and the magnetic head of a device for picking up objects according to the present application.
Figure 10:
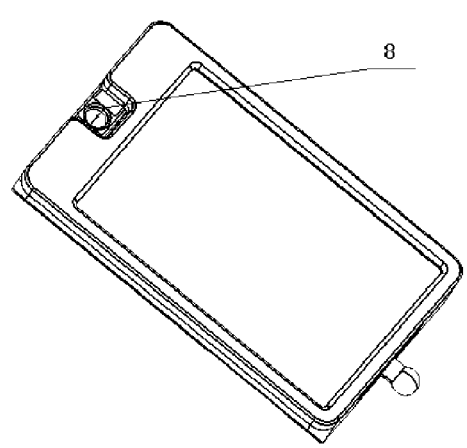
FIG. 10 is a view of the head of the device for picking up objects when the lamp rotating of a device for picking up objects according to the present application.

According to an embodiment of this application, the connection mode of the handle 2 and the magnetic head 1, the hose connection which is exemplified in FIG. 8 and the angel clamp which is exemplified in FIG. 9, which are placed on the movable connection between the handle 2 and the magnetic head 1.

This device can be used when metal objects fall in dark and narrow places and it hard to find the metal objects. Utilizing the device for picking up objects, one may pick up metal objects successfully. By holding onto the handle 2, opening the switch 12 and turning on the lamps, one may easily find the location of the fallen objects through the lens 3. After finding the location of the fallen objects, one can slide the lens 3 and pick up the fallen objects through the magnet block 9 which is set on the head of magnetic head 1. It is easy to operate. The device for picking up objects is easy disassembled. For an integrated design, the bulk of the device for picking up objects is small and is easy to carry and store.

What is claimed is:

1. A device for picking up objects comprising:
   a magnetic head (1);
   a handle (2); and
   a movable component set between the magnetic head (1) and the handle (2); a lens (3) movably set on the magnetic head (1); the lens (3) comprising a front cover (4) and a rear cover (5); two lamps (7), (8) and a magnetic block (9) set on the magnetic head (1);
   an additional magnet block (10) set on bottom of the handle (2);
   batteries (11), switches (12), or wires set on the inside of the magnetic head (1) or the handle (2);
   a groove (13) set on the back of the rear cover (5), the magnetic head (1) set in a groove (13); a chute (14) set on the left and right wall of the magnetic head (1); and a fastening strip (15) matched with the chute (14) set on both sides of the groove (13).

2. The device of claim 1, further comprising a telescopic rod (16) set on the handle (2).

3. The device of claim 2, further comprising lamps (17) set on the back of the rear cover (5).

4. The device of claim 1, wherein the lamp (8) is fixed on the front of the magnetic head (1) by a rotating shaft.

* * * * *